INVENTOR.
Melville F. Peters
BY
Martin J. Finnegan
ATTORNEY

_United States Patent Office_

2,916,052
Patented Dec. 8, 1959

2,916,052

ENERGY TRANSFER SYSTEM

Melville F. Peters, Livingston, N.J.

Application January 4, 1955, Serial No. 479,827

2 Claims. (Cl. 138—30)

This invention relates to energy transfer, and particularly to the transfer and absorption of the kinetic energy in a moving mass as the mass is decelerated to zero velocity.

When a mass having a relatively large amount of kinetic energy is to be brought to rest in a relatively short distance, the medium which absorbs the kinetic energy must have the properties of a fluid or an elastomer, if the absorbtion of the energy is to take place without having some part of the system exceed the elastic limit. The most efficient and economical way of absorbing the energy from the mass is to use an expansion chamber and to compress a vapor in contact with its liquid at the maximum pressure permitted in the system. The vapor pressure of the liquid is determined by the temperature of the fluid and when the temperature of the fluid is held constant, the vapor pressure remains constant and independent of the change in volume the expansion chamber undergoes during the absorption of the energy from the mass. To clarify this statement, it is helpful to consider the three surge units which can be used for absorbing kinetic energy, where the first unit absorbs energy by compressing a spring, the second unit absorbs energy by compressing a gaseous material and the third unit compresses a vapor which is in equilibrium with its liquid phase, so that it is compressed at a constant pressure. In all three units a fluid is used to transmit the kinetic energy to a bellows, which in turn uses the energy to compress the spring, the gas, or the vapor which is in equilibrium with the liquid phase. Let the operating pressure in the system be 50 p.s.i. and let $10^4$ be the number of inch pounds of energy to be dissipated by the expansion chamber when the rate of flow of the fluid is interrupted without the surge pressure exceeding 200 p.s.i.

When the kinetic energy of the mass is used to compress the spring, the work W is written:

$$W = Fs/2 = PAs/2 = Ks^2/2$$

where F is the force produced by pressure P acting on a bellows with an effective area A, $s$ is the distance the bellow is compressed and K the spring constant of the bellows. If the cross sectional area of the bellows is taken as 18 square inches, the average force acting on the bellows is $$\frac{50+200}{2} \times 18 = 2250 \text{ pounds}$$

Since $$W = \frac{PAs}{2}, \quad s = \frac{10^4}{2250} = 4.4 \text{ inches}$$

which is the stroke required of the bellows to absorb $10^4$ inch pounds. The spring rate of the bellows is $$K = \frac{2 \times 10^4}{(4.4)^2} = 1033 \text{ pounds per inch}$$

From the results of a number of tests it has been found that this bellows must be 17 inches long to give a satisfactory life when the stroke is 4.4 inches and the maximum pressure is 200 p.s.i.

When the kinetic energy is absorbed by compressing a gas such as hydrogen or helium adiabatically from a volume $V_1$ at pressure $P_1$ to a volume $V_2$ at a pressure $P_2$, the work W is equal to $$W = \int_{V_1}^{V_2} P dv = P_1 V_1 \log \frac{V_1}{V_2}$$

where for all practical purposes, $P_1 V_1 = P_2 V_2$, and this can be written, $$\frac{P_1}{P_2} = \frac{V_2}{V_1} = \frac{50}{200} = 4$$

where, $P_1 = 50$ p.s.i. and $P_2 = 200$ p.s.i. Then $10^4 = 50 V_1 \log_e 4$ and the initial volume, $$V_1 = \frac{10^4}{50 \log_e 4} = 144 \text{ inch}^3$$

$V_2 = 36$ inch$^3$, and the change in volume, $\Delta V = V_1 - V_2 = 144 - 36 = 108$ inch$^3$. Since the change in volume $\Delta V = As$, or $$s = \frac{\Delta V}{A}$$

the stroke required of the bellows to absorb $10^4$ inch pounds is, $$s = \frac{108}{18} = 6.0 \text{ inches}$$

The effective pressure ($Pe$) multiplied by the change in volume $\Delta V$, is equal to the kinetic energy, so that, $$Pe = \frac{W}{\Delta V} = \frac{10^4}{108} = 92.6 \text{ p.s.i.}$$

Consider the third example where the temperature has been adjusted so that the vapor and liquid phases are in equilibrium at the maximum pressure which is 200 p.s.i. Then $W = PAs = 200 \times 18 \times s = 10^4$ inch pounds, or $s = 2.78$ inches, which is the stroke the bellows must execute to absorb $10^4$ inch pounds. This reduces the stroke of the bellows from 6.0 inches to 2.8 inches and reduces the length of the bellows from 17 inches to $$\frac{2.8}{6.0} \times 17 = 7.9 \text{ inches}$$

or a saving in bellows length of 54 percent when the energy is expended in compressing a vapor at the maximum pressure of 200 p.s.i., instead of compressing the gas adiabatically from 50 p.s.i. to 200 p.s.i.

It is therefore the first object of the invention to fill the flexible portion of the surge chamber with a saturated vapor. It is a second object of the invention to absorb the kinetic energy in a system by compressing a saturated vapor in a surge chamber.

When the kinetic energy is dissipated by compressing the vapor at a constant pressure P, it is necessary to keep the liquid, the vapor and the walls of the compartment contacted by the liquid and vapor at temperature T, which is the temperature at which the vapor pressure of the liquid is P.

When the liquid and vapor are in equilibrium at temperatures well below the ambient temperature, it is possible to collect the vapors in a dome or other inclosure, serving as an expansion chamber. When the velocity of the liquid is suddenly reduced, the kinetic energy of the liquid will be expended in compressing the vapors in the dome. During the compression of the vapors the liquid will be brought into contact with surfaces that, in general, have not been cooled to the temperature of the system, and at these boundary surfaces some of the liquid will evaporate. The evaporation at these surfaces can produce a volume of vapor which can exceed, equal, or be less than the volume of vapor condensed, so that the compression is not likely to occur at exactly the vapor pressure of the liquid. The pressure of the vapor in the dome will never be less than the vapor pressure of the liquid, and can exceed this pressure if the walls of the dome are poorly insulated. When the dome is made large enough, the work expended in compressing the vapor will be great enough to absorb all the kinetic energy from the liquid and bring the fluid to rest.

If the temperature and pressure of the fluid are well above the ambient temperature and pressure, it is possible to collect the vapor from the liquid in a thermally insulated or heated dome and to dissipate the kinetic energy developed in the liquid by compressing the vapor, or to adopt the method which has become standard practice in steam power plants, namely, to use a separate boiler to generate steam for the dome. Both these methods have the disadvantage of limiting the pressure in the dome to the vapor pressure, or the steam pressure of the system and consequently requires the kinetic energy to be absorbed from the liquid by compressing a vapor at approximately the operating pressure of the system. This in itself is not a serious disadvantage, since the water is in contact with the steam and does not require the relatively large bellows which must be used when kinetic energy is absorbed by compressing a gas or vapor at a relatively low pressure. When a separate boiler is used to suppy the vapor to the dome, there is the disadvantage of requiring this additional unit. When the dome is sealed from the liquid with a bellows, the compartment formed by the bellows and the dome can be reduced in size by using a vapor in the compartment which is condensed at the maximum safe operating pressure of the system.

It is not always convenient to control the temperature so that the liquid and vapor are in equilibrium at the limiting pressure of the system. It is possible, however, to approach the advantages of compressing a vapor which is in equilibrium with the liquid phase at a constant pressure, by compressing a material in the gaseous state with another material in the liquid state, provided the gaseous material is readily dissolved or absorbed by the liquid. For example, carbon dioxide, ethylene, and ammonia vapor are dissolved by water or alcohol in the liquid state and acetylene is dissolved by acetone. This means that the mixture of gaseous and liquid materials can be compressed at a higher effective pressure than otherwise. Similarly, a combination of activated solid material, such as activated alumina, carbon, magnesia, silica gel, and paraffin, can be used to condense selected gases and vapors, so that the mixtures of the selected gases and vapors can be compressed at a higher effective pressure than otherwise.

The volume of gases or vapors absorbed, dissolved, condensed, or evaporated by a liquid can be increased by increasing the area exposed to the gaseous phase. This area can be increased by using the solid and liquid phases of one or more materials, such for example as soaking asbestos or carbon in acetone or water to increase the rate at which $CO_2$ is absorbed by the liquid, so that the rate at which the gaseous material is absorbed in the sealed compartment of the surge chamber can be increased by using a solid to increase the area of the liquid exposed to the gaseous material.

A second advantage of dissipating the kinetic energy of a mass by condensing a vapor, or by a solid or liquid absorbing material in the gaseous phase, is that the damping of the system is increased. This damping will be very great when the gases and vapors absorbed by the liquids and solids involve a time delay in reaching a pressure equilibrium in the system, so that the exchange of energy between the fluids in the compartment of the surge chamber will be out of phase with the oscillating mass and consequently will have the overall effect of serving as a damping agent. A familiar example of this kind of damping occurs when the mass of a pendulum is used to support a second pendulum.

It is therefore a third object of the invention to partially fill the compartment which experiences a change in volume when the bellows is changed in length with a liquid and then add a gaseous material to the compartment which is at least partially soluble in the liquid, so that when the mixture is compressed some of the gaseous material will be dissolved by the liquid. It is a fourth object to seal a solid material, a liquid material, and a gaseous material in a flexible chamber, so that the pressure developed in the sealed chamber when a quantity of kinetic energy is absorbed from a mass, will be less than when the compression is made with just the gaseous and liquid phases.

It is a fifth object of the invention to use a mixture of gaseous material in a combination with a solid material to increase the damping action of the bellows.

It is a sixth object of the invention to absorb the energy from a liquid which is developed when its rate of flow is suddenly changed by compressing its vapor which has collected in a dome or chamber. It is a seventh object of the invention to thermally insulate the fluid-tight container and after hermetically sealing the ends of the chamber to the ends of the container, remove the air from the compartment formed by the outer walls of the expansion chamber and the inner walls of the enveloping container. It is an eighth object of the invention to provide a safety valve so as to relieve the pressure when it exceeds a predetermined value.

It is a ninth object of the invention to use carbon dioxide in at least two of its three phases to absorb kinetic energy in a surge chamber.

It is a tenth object to supply temperature controls to regulate the temperature of the solid phase, the liquid phase, or both the solid and liquid phases of the fluids in the sealed compartment of an expansion chamber.

An eleventh object is to supply temperature controls to control the temperature of the surfaces contacting the gaseous material in the sealed compartment of the expansion chamber.

A twelfth object is to supply temperature controls to control the temperature of the sealed compartment and the surfaces of the sealed compartment.

When the pressure on one cubic inch of water is increased from one atmosphere to $10^4$ atmospheres, the volume of the water is decreased to 0.8 cubic inch, so that if a piston having an effective area of 18 square inches is to be stopped within three-fourths of an inch, the expansion chamber must contain 54 cubic inches of water. All liquids are compressed when subjected to pressures, some having a greater bulk modulus than water, and others having a smaller bulk modulus.

A thirteenth object of the invention is to fill a flexible bellows with a liquid and to use the compression of the liquid to absorb the kinetic energy from the masses in the system.

A fourteenth object is to provide a quantity of liquid in the surge chamber so that the energy absorbed by compressing the fluid will absorb the energy from the moving mass with a volume change from $V_1$ to $V_2$ and a pressure change from $P_1$ to $P_2$, where $P_1$ is the operating pressure and $P_2$ is the maximum pressure permitted in the system.

In the foregoing analysis the mass of the bellows has been disregarded, as it is in general very small compared to the masses moving in the system. Similarly the spring action of the bellows has been disregarded, as the energy absorbed by the spring is in general very small compared to the energy required to compress the gases and vapors.

It is also recognized that all gases and vapors deviate from the relation, $pv=$constant, as the pressure P is increased, and this is especially true for gaseous material such as carbon dioxide, ethylene, and other gaseous material having a large molecular diameter. Regardless of the deviation of these vapors from the relation $pv=$constant, it is always possible to make the change in pressure from $P_1$ to $P_2$ less for the volume change from $V_1$ to $V_2$ when a liquid or solid is compressed with these gases and vapors.

Figure 1:
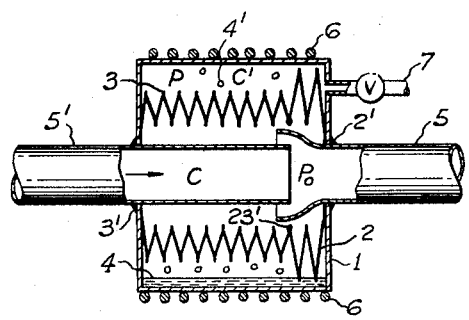
Fig. 1 is a sectional view of apparatus embodying the invention.

The surge chamber in Figure 1 has a fluid tight housing 1 and conduits 5, 5' for conducting the fluid in the system at pressure $P_0$ through compartment C. Bellows 2 and 3 which are joined together at 23', has the free end of bellows 2 secured to one of the end plates of housing 1 and 2' and the free end of bellows 3 secured to the other end plate of housing 1 at 3'. The fluid which is designated in the liquid state by 4 and in the vapor state by 4', is introduced into C' through valve V at 7 and the temperature of the chamber together with the fluid is controlled by coils 6.

The bellows elements 2, 3 which are responsive to the changes in pressure in conduits 5, 5', consists of a bellows 2 which has an effective area equal to a piston with an area of $\pi/16(OD+ID)_2^2$ and a bellows 3 which has an effective area equal to a piston with an area of $\pi/16(OD+ID)_3^2$, where $(OD+ID)_2^2$ means the sum of the outside diameter and inside diameter of bellows 2 squared, and $(OD+ID)_3^2$ means the sum of the outside diameter and the inside diameter of bellows 3 squared. Since the piston area of bellows 2 is greater than the piston area of bellows 3, an increase in the pressure $P_0$ in compartment C of the expansion chamber, will cause bellows 2 to elongate and compress bellows 3. This elongation of bellows 2 and compression of bellows 3, decreases the volume of C' and compresses the vapor 4' which is in contact with its liquid 4. The pressure P is held constant during the change in volume of C' by using coil 6 to maintain the fluid at a constant temperature T.

When the temperature T of the fluid 4, 4' in C' are to be maintained below the ambient temperature, a cooling mixture is passed through the coils 6 and when the temperature of the chamber is to be maintained above the ambient temperature, the surge chamber is heated by passing an electric current or hot fluid through the coils. The work done in decreasing the volume of the chamber C' from $V_1$ to $V_2$ by compressing the bellows combination 2, 3 at pressure P and temperature T, is equal to $P\cdot(V_1-V_2)$ and this equals the amount of energy which can be removed from the fluid in the system by compressing the vapor 4'. In general the spring constant of bellows 2 and 3 is low, so that the energy required to compress the bellows assembly can be neglected.

When the surge chamber is to be used in a system with a maximum permissible pressure of 25 p.s.i., the fluids 4 and 4' can be ammonia and the control coils 6 can be set to hold the temperature at $-8°$ C. At this temperature the liquid and vapor are in equilibrium, because the vapor pressure of liquid ammonia at $-8°$ C. is 25 p.s.i. When the maximum permissible pressure is 100 p.s.i., the fluid 4 and 4' can be water, and the control coils 6 can be set to hold the temperature at approximately 164° C. At this temperature the water and steam are in equilibrium because at 164° C. the vapor pressure of water is approximately 100 p.s.i. and the work done in compressing the steam at 100 p.s.i. from a volume of $V_1$ to a volume of $V_2$ is equal to $100(V_1-V_2)$. In this manner a liquid can be selected which has a vapor pressure P when operated at a temperature T.

Figure 2:
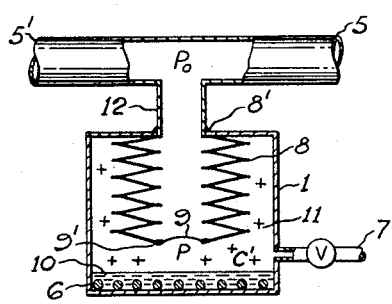
Fig. 2 is a sectional view of a second embodiment.

The surge chamber in Figure 2 consists of a housing 1, a bellows 8 with one end sealed to 1 at 8' and the other end sealed to the end plate 9 at 9'. The T section 12 which is a part of conduits 5 and 5', is connected to housing 1 at 8'. The expansion chamber has two conduits to provide an inlet and outlet for the fluids in the system which have a normal operating pressure of $P_0$. The vapor or gases 11 in compartment C' must be readily soluble in the liquid 10. These fluids are introduced into the housing 1 through valve V at 7, and the temperature of chamber 1 together with the fluids are controlled by the coils 6.

When the pressure $P_0$ in the system is increased, the bellows 8 will expand and increase the pressure P of the gaseous material in chamber C'. Since the volume of the gaseous material absorbed by a liquid will increase with an increase in pressure, it is possible to increase the ratio between the change in volume of gases and vapors in a compartment with unit change in pressure, by putting a liquid in the compartment to dissolve the gaseous material during the compression stroke. When this liquid is 10 and it is added to compartment C' of the surge chamber, the initial pressure of the compression stroke which changes the volume from $V_1$ to $V_2$, can be increased without raising the pressure at the completion of the stroke above $P_2$, which means, that the effective pressure of the compression stroke can be increased by adding the liquid 10 to C'. Since the energy which must be absorbed from the fluid in the system when it is brought to rest, is equal to the effective pressure multiplied by the change in volume, an increase in the effective pressure will allow the same work to be performed with a smaller change in volume and consequently the surge chamber can be reduced in size when it uses a liquid 10 to dissolve the gaseous material 11 during the compression of these gases.

Water is a good example of a liquid which can be used in the compartment C' of a surge chamber to dissolve gaseous material such as ammonia or carbon dioxide. Other liquids such as alcohol, acetone, or a combination of these liquids can be substituted for water, and some of the vapors which are soluble in one or more of these liquids are carbon dioxide, acetylene, ammonia, and many others.

Figure 3:
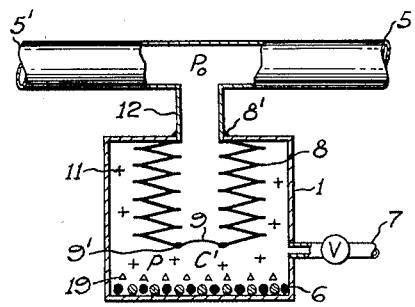
Figs. 3 and 4 are sectional views of two additional embodiments.

The mechanical construction of the expansion or surge chamber shown in Figure 3 is the same as the construction of the chamber shown in Figure 2. The porous material 19 in compartment C' is selected so that it adsorbs the gaseous material 11. When the volume of compartment C' is decreased the pressure in the compartment is increased and consequently some of the gaseous material is adsorbed or condensed on material 19, so that the ratio between the change in volume of the gases and vapors in compartment C' with unit change in pressure, can be increased by putting a porous material 19 in the compartment to adsorb the gaseous material during the compression stroke. The same explanation given with Figure 2, for permitting a reduction in the size of the surge chamber when a liquid 10 is used in compartment C' to dissolve the gases during the compression stroke, can be extended to include a reduction in the size of the surge chamber when the porous material 19 is substituted for the liquid.

Figure 4:
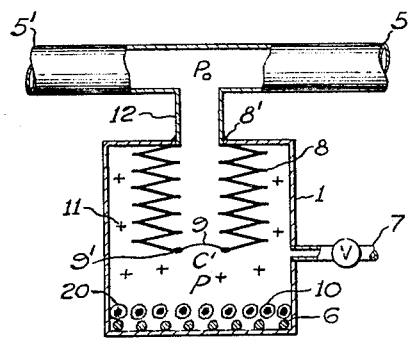

The surge chamber in Figure 4 has the same mechanical construction throughout as the surge chamber in Figures 2 and 3. The bricks 20 are formed from porous material and then saturated with a liquid 10 to increase the area of liquid in contact with vapors 11. This greater area between liquid and gaseous material created by the porous material, will make the rate at which the gaseous material is adsorbed under the same conditions of pressure and temperature, greater than it is for the same quantity of liquid which has not been dispersed through the porous material. The same explanation given with Figure 2, for permitting a reduction in the size of the surge chamber when a liquid 10 is used in compartment C' to dissolve the gases during the compression stroke, can be extended to include a reduction in the size of the surge chamber when the liquid 10 dispersed in the porous material 20, is substituted for the undispersed liquid.

Figure 5:
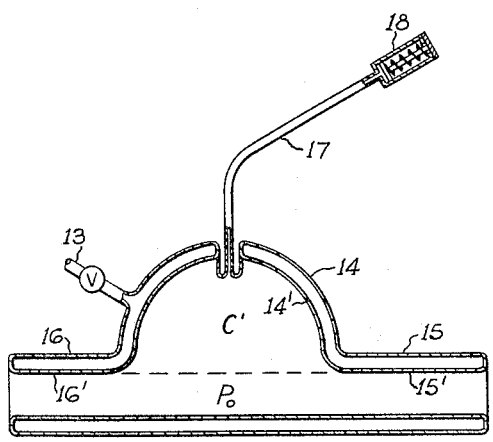
Fig. 5 is a diagrammatic view of a fifth embodiment.

The inner wall 14', 15', 16' of the surge chamber in Figure 5, is thermally insulated by enveloping the two conduits 15', 16' and dome 14' with an outer wall 14, 15, 16 and then evacuating the assembly through outlet 13, after welding the free end 15 to 15' and the free end 16 to 16'. The vacuum can be retained by closing valve V before disconnecting the vacuum pump. A vent pipe 17 with a safety valve 18 allows the gases and vapors to escape when the pressure in the dome exceeds a predetermined value. This safety precaution is necessary when the liquid is oxygen, nitrogen or other gases having a low boiling point and must be operated at a relatively high ambient temperature. The vapors which are formed when the liquid is evaporated by heat passing into the system will collect in dome 14'. When the pressure $P_0$ is increased, liquid will be forced into the dome and brought into contact with portions of the walls of 14' that have been in contact with the vapor and consequently are at a higher temperature than the liquid. These hotter surfaces will evaporate some of the contacting liquid and this will increase the pressure in the dome. This increase in pressure will cause some of the vapor in contact with the liquid to condense and some to escape through vent 18, so that the compression of the vapor in dome 14', will take place at approximately the vapor pressure of the liquid and this in turn is determined by the temperature of the liquid, so that the energy which can be absorbed from the fluid is $P(V_1-V_2)$, where P is the vapor pressure of the liquid which is at temperature T, and $V_1-V_2$ is the change in volume.

Figure 6:
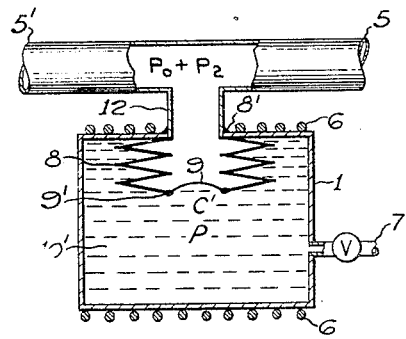
Fig. 6 is a sectional view of a sixth embodiment.

The surge or expansion chamber in Figure 6 has the same mechanical construction throughout as the surge chambers in Figures 3 and 4. The compartment C' in Figure 6 however is completely filled with a liquid 10', so that when the pressure in the system is increased from $P_0$ to $(P_0+P_2)$, the decrease in volume of compartment C', is equal to the decrease in volume of the liquid 10' when it experiences an increase in pressure from $P_0$ to $(P_0+P_2)$. Since the energy absorbed by the expansion chamber from the fluid in the system when the rate of flow of the fluid is changed, equals the effective pressure in the system multiplied by the change in volume of the expansion chamber, it follows that the system must be constructed to withstand high pressures when a large mass of fluid is flowing at a high velocity, so that the liquid 10' can be subjected to pressures high enough to compress it through an appreciable change in volume. This becomes clear from the equation, where the Work=$W=(P_{effective})(V_1-V_2)$ is large When $P_{effective}$ is large the change in pressure $P_2$ will be large and the change in colume will be relatively large, so that W will be large. When $P_{effective}$ is small, the change in pressure $P_2$ will be small and the change in volume will be relatively small, so that W will be small.

What I claim is:

1. In an energy transfer system, a surge chamber containing a saturated vapor, and means including a bellows in the chamber for applying a pressure differential to said chamber to cause compression of said vapor.

2. In an energy transfer system, a surge chamber having a flexible seal defining the volume thereof, and also having a solid material disposed therein, a gaseous mixture in said chamber, said gaseous material being absorbable with said solid material to increase the damping capacity of said flexible seal.

References Cited in the file of this patent

UNITED STATES PATENTS

| | | |
|---|---|---|
| 1,830,869 | Charles | Nov. 10, 1931 |
| 1,932,666 | Hyatt | Oct. 31, 1933 |
| 2,012,872 | Gillen | Aug. 27, 1935 |
| 2,081,799 | Doran | May 25, 1937 |
| 2,401,791 | Overbeke | June 11, 1946 |
| 2,561,528 | Meyers | July 24, 1951 |
| 2,682,893 | Ziebold | July 6, 1954 |
| 2,731,037 | Schindler et al. | Jan. 17, 1956 |
| 2,755,820 | Taylor | July 24, 1956 |